(12) United States Patent
Tsuchida et al.

(10) Patent No.: US 7,851,562 B2
(45) Date of Patent: Dec. 14, 2010

(54) WATER-SOLUBLE SILICON-CONTAINING POLYMER, MAKING METHOD, COATING COMPOSITION, AND COATED ARTICLE

(75) Inventors: Kazuhiro Tsuchida, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 353 days.

(21) Appl. No.: 11/945,554

(22) Filed: Nov. 27, 2007

(65) Prior Publication Data

US 2008/0132652 A1   Jun. 5, 2008

(30) Foreign Application Priority Data

Nov. 27, 2006  (JP) .............................. 2006-318523

(51) Int. Cl.
 *C08F 283/00* (2006.01)
(52) U.S. Cl. ........................................ 525/474; 528/38
(58) Field of Classification Search ................. 525/474; 528/38
See application file for complete search history.

(56) References Cited

U.S. PATENT DOCUMENTS

| | | | | |
|---|---|---|---|---|
| 6,010,757 | A * | 1/2000 | Yamamoto et al. | 428/1.25 |
| 6,159,546 | A * | 12/2000 | Yamamoto et al. | 427/358 |
| 7,067,592 | B2 * | 6/2006 | Chino et al. | 525/327.6 |
| 2006/0023044 | A1* | 2/2006 | Bauer | 347/100 |
| 2006/0189736 | A1* | 8/2006 | Mori et al. | 524/404 |
| 2008/0166317 | A1* | 7/2008 | Keller et al. | 424/78.17 |

FOREIGN PATENT DOCUMENTS

| | | |
|---|---|---|
| JP | 52-12278 | 1/1977 |
| JP | 10-7883 A | 1/1998 |
| JP | 10-319358 A | 4/1998 |
| JP | 2001-270974 A | 10/2001 |
| JP | 2004/018587 A | 1/2004 |
| WO | WO 86/07072 A1 | 12/1986 |
| WO | 2006/120185 A1 | 11/2006 |
| WO | WO2006/120185 A1 | 11/2006 |

OTHER PUBLICATIONS http://www.polysciences.com/Catalog/Department/Product/98/categoryID—298/productId—2639/, 3 pages, 2009.*
Japanese Office Action Issued May 13, 2009 in Corresponding Japanese Application No. 2006-318523.
European Search Report issued Apr. 3, 2008 in EP 07 254 423; EPO Form 1507, EPO Form 1503, EPO Form P0459; including Examination Report EPO Form 1703, 3 pgs. Published in English.

* cited by examiner

*Primary Examiner*—Randy Gulakowski
*Assistant Examiner*—Robert Loewe
(74) *Attorney, Agent, or Firm*—Westerman, Hattori, Daniels & Adrian, LLP

(57) ABSTRACT

A water-soluble silicon-containing polymer is provided comprising recurring units having formula (1) wherein $10 \leq m \leq 260$, $1 \leq n \leq 100$, X is an alkylene chain which may have an alkyl substituent, R is H, alkyl or acetyl, and "a"=1, 2 or 3. The polymer has more than one primary amino group per hydrolyzable silyl group, affording an increased number of reaction sites with organic resins and forming a firm bond therewith.

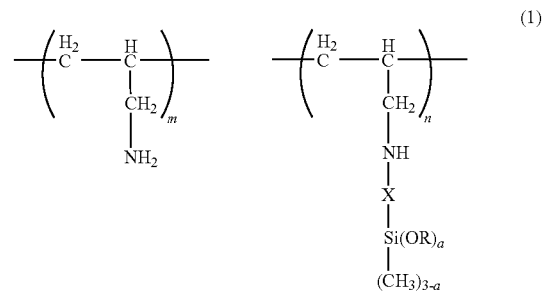

(1)

2 Claims, No Drawings

WATER-SOLUBLE SILICON-CONTAINING POLYMER, MAKING METHOD, COATING COMPOSITION, AND COATED ARTICLE

CROSS-REFERENCE TO RELATED APPLICATION

This non-provisional application claims priority under 35 U.S.C. §119(a) on Patent Application No. 2006-318523 filed in Japan on Nov. 27, 2006, the entire contents of which are hereby incorporated by reference.

TECHNICAL FIELD

This invention relates to novel water-soluble silicon-containing polymers and a method for preparing the same. More particularly, it relates to water-soluble silicon-containing polymers containing a plurality of primary amino groups and a hydrolyzable silyl group and having water solubility and high reactivity with organic and inorganic resins, a method for preparing the same, a coating composition comprising the same, and an article coated and treated therewith.

BACKGROUND ART

In the prior art, composite materials are prepared by treating glass fiber preforms such as glass cloth, glass tape, glass mat, and glass paper and mica preforms serving as an inorganic reinforcement with organic resins such as epoxy resins, phenolic resins, polyimide resins and unsaturated polyester resins. These composite materials find use in a wide variety of applications. Laminates are often made of such composite materials. It is desired to improve the mechanical strength, electrical properties, water resistance, boiling water resistance, chemical resistance, and weatherability of such laminates. It was proposed to pretreat the inorganic reinforcements with silane coupling agents such as γ-aminopropyltriethoxysilane, β-aminoethyl-γ-aminopropyltrimethoxysilane, and γ-glycidoxypropyltrimethoxysilane, prior to the treatment with organic resins. This pretreatment enhances the adhesion of resins to the inorganic reinforcements.

Among others, those composite materials using phenolic resins as the organic resin have excellent heat resistance, dimensional stability and moldability and have long been used as the molding material in the basic industrial fields including automobiles, electric and electronic equipment. Under the recent trend aiming at reduced cost and weight, active attempts have been made to replace metal parts by high-strength molded parts of glass fiber-reinforced phenolic resins. In order to promote metal replacement in the future, the key is to achieve a high strength which has never been reached by prior art glass fiber-reinforced phenolic resin moldings. To achieve a high strength, many techniques of treating glass fibers with amino-silane coupling agents to enhance the adhesion to the matrix resin have been proposed. The treatment with coupling agents alone, however, encounters certain limits in enhancing strength. Under the circumstances, several techniques have been proposed for further improving the adhesion between glass fibers and matrix resins.

JP-A 52-12278 discloses that glass fibers to be admixed with a thermosetting resin are pretreated by applying a primer resin compatible with the thermosetting resin or a mixture of the primer resin and another primer agent such as a silane coupling agent closely to surfaces of glass fibers. It is described that high strength is achieved by dispersing the pretreated fibers in the thermosetting resin. This technique, however, exerts a rather little effect of enhancing the strength of molding material and is uneconomical because autoclave treatment is necessary at the stage when glass fibers are pretreated. For a diallyl phthalate polymer matrix, glass fibers pretreated with a diallyl phthalate polymer and a silane coupling agent are used. The disclosure thus refers to only the strength enhancement effect due to reaction and interaction between these diallyl phthalate resins, but nowhere to phenolic resin molding materials.

JP-A 10-7883 discloses a technique of producing a phenolic resin composition with improved rotational rupture strength by first sizing glass fibers with a phenolic resin of the same type as a matrix phenolic resin, then treating them with a coupling agent, and incorporating the treated glass fibers in a phenolic resin composition. With this technique, however, surfaces of glass fibers are directly treated with the phenolic resin. Since the phenolic resin generally has weak chemical bonding forces with glass fibers, a firm adhesion is not available between the fibers and the matrix resin. This technique is thus less effective in enhancing the strength of molding material.

In connection with the above technique, JP-A 2001-270974 discloses a technique of improving the mechanical strength of a phenolic resin composition at normal and elevated temperatures by treating glass fibers with a phenolic resin of the same type as a matrix phenolic resin and an amino-silane coupling agent at the same time, or treating with an amino-silane coupling agent and then with a phenolic resin of the same type as a matrix phenolic resin, and incorporating the treated fibers in a phenolic resin composition. The amino-silane coupling agent used herein has one or two primary amino and secondary amino groups per hydrolyzable silyl group. The degree of bond between the coupling agent with which glass fibers are treated and the phenolic resin is not sufficient. Then the coupling agent is regarded to be a factor of reducing the strength of the resin composition.

DISCLOSURE OF THE INVENTION

An object of the invention is to provide a water-soluble silicon-containing polymer containing a plurality of amino groups capable of reacting with an organic resin portion to form bonds and thus useful as a primer, a method for preparing the same, a coating composition comprising the same, and an article coated and treated with the composition.

The inventor has succeeded in synthesizing a water-soluble silicon-containing polymer having a plurality of amino groups capable of reacting with an organic resin to form chemical bonds per hydrolyzable silyl group capable of reacting with an inorganic material to form a chemical bond.

In a first aspect, the invention provides a water-soluble silicon-containing polymer comprising recurring units having the general formula (1) and bearing a plurality of primary amino groups and a hydrolyzable silyl or silanol group.

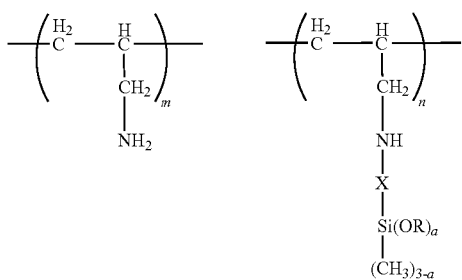

(1)

Herein m is a number from 10 to 260, n is a number from 1 to 100, X is a $C_1$-$C_{10}$ alkylene chain which may be substituted with a $C_1$-$C_6$ alkyl group, R is hydrogen, a $C_1$-$C_4$ alkyl group or acetyl group, and "a" is an integer of 1 to 3.

Also provided is a water-soluble silicon-containing polymer comprising recurring units having the general formula (2) and bearing a plurality of primary amino groups and a hydrolyzable silyl or silanol group.

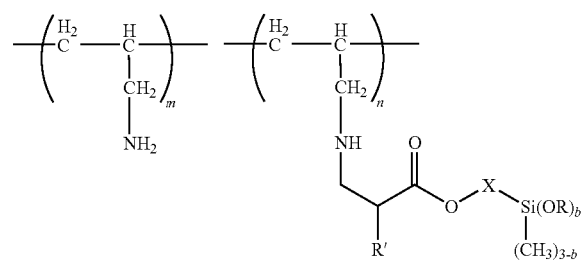

(2)

Herein m is a number from 10 to 260, n is a number from 1 to 100, X is a $C_1$-$C_{10}$ alkylene chain which may be substituted with a $C_1$-$C_6$ alkyl group, R is hydrogen, a $C_1$-$C_4$ alkyl group or acetyl group, R' is hydrogen or methyl, and "b" is an integer of 1 to 3.

In preferred embodiments, some amino groups are in the form of hydrogen chloride salts and/or organic acid salts; m and n are numbers in the range: $0.003 \leq n/(m+n) \leq 0.9$; and the polymer has an average molecular weight of 300 to 3,000.

In a second aspect, the invention provides a method for preparing a water-soluble silicon-containing polymer comprising recurring units having the general formula (1), the method comprising the steps of reacting a water-soluble primary amino group-containing polymer having the general formula (3):

(3)

wherein m and n are as defined above, with a silicon compound having the general formula (4):

$$Y-X-Si(OR)_a(CH_3)_{3-a} \qquad (4)$$

wherein Y is a halogen atom, X, R, and "a" are as defined above, in an alcohol and/or water, and neutralizing the hydrogen halide resulting from the reaction.

Also provided is a method for preparing a water-soluble silicon-containing polymer comprising recurring units having the general formula (2), the method comprising the steps of reacting a water-soluble primary amino group-containing polymer having the general formula (3):

(3)

wherein m and n are as defined above, with a silicon compound having the general formula (5):

$$CH_2=CR'-COO-X-Si(OR)_b(CH_3)_{3-b} \qquad (5)$$

wherein X, R, R', and "b" are as defined above, in an alcohol and/or water, and neutralizing the hydrogen halide resulting from the reaction.

In the method for preparing a water-soluble silicon-containing polymer of formula (1), after the step of reacting the water-soluble polymer having formula (3) with the silicon compound having formula (4) in an alcohol and/or water, the hydrogen halide resulting from the reaction may not be neutralized so that in the water-soluble polymer of formula (1), some amino groups are in the form of hydrogen halide salts.

In preferred embodiments, m and n are numbers in the range: $0.003 \leq n/(m+n) \leq 0.9$; and the water-soluble polymer has an average molecular weight of 300 to 3,000.

In a third aspect, the invention provides a coating composition comprising the water-soluble silicon-containing polymer and water and/or an organic solvent.

In a fourth aspect, the invention provides an article which is coated and treated with the coating composition.

BENEFITS OF THE INVENTION

Since a plurality of primary amino groups are included per hydrolyzable silyl group in the molecule, the water-soluble silicon-containing polymer of the invention offers an increased number of reaction sites with organic resins and hence stronger bonding forces thereto, as compared with prior art amino-silane coupling agents. When inorganic fillers such as glass fibers and silica, ceramics and metal substrates are coated or treated with the polymer, a better performance is achieved as compared with prior art amino-silane coupling agents having an amino to silyl group ratio of 1:1 in the molecule.

DESCRIPTION OF THE PREFERRED EMBODIMENT

The notation (Cn-Cm) means a group containing from n to m carbon atoms per group. The term "polymer" refers to high-molecular-weight compounds.

The water-soluble silicon-containing polymers of the invention have the general formulae (1) and (2).

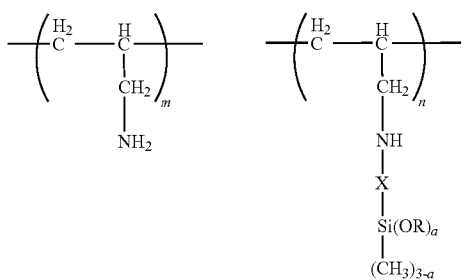

(1)

Herein m is a number from 10 to 260, n is a number from 1 to 100, X is a $C_1$-$C_{10}$ alkylene chain which may be substituted with a $C_1$-$C_6$ alkyl group, R is hydrogen, a $C_1$-$C_4$ alkyl group or acetyl group, and "a" is an integer of 1 to 3.

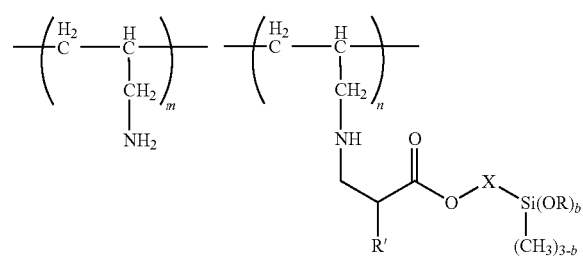

(2)

Herein m is a number from 10 to 260, n is a number from 1 to 100, X is a $C_1$-$C_{10}$ alkylene chain which may be substituted with a $C_1$-$C_6$ alkyl group, R is hydrogen, a $C_1$-$C_4$ alkyl group or acetyl group, R' is hydrogen or methyl, and "b" is an integer of 1 to 3.

Preferably, m and n are in the range: $10 \leq m \leq 100$ and $1 \leq n \leq 80$, and more preferably $10 \leq m \leq 75$ and $1 \leq n \leq 50$. It is noted that the polymers of formulae (1) and (2) are terminated with hydrogen atoms.

The water-soluble silicon-containing polymer has a plurality of primary amino groups, and is present in such a state that some amino groups within its molecular structure have reacted with a silane coupling agent to form bonds. Specifically, in a first embodiment wherein a silane coupling agent having a haloalkyl group is used, dehydrochlorination reaction occurs in such a way that the nitrogen atom of an amino group is attached to the carbon atom to which the halogen has been attached, resulting in a structure in which the nitrogen and silicon atoms are linked by an alkylene chain. In a second embodiment wherein a silane coupling agent having a (meth)acrylic group is used, the nitrogen atom of an amino group undergoes Michael addition (or 1,4-addition) to an unsaturated carbon of a (meth)acrylic group, resulting in a structure in which the nitrogen and silicon atoms are linked by an alkylene chain which is separated by an oxygen atom and has a carbonyl carbon incorporated midway. The aforementioned reaction of an amino group with a silane coupling agent may be carried out either prior to or subsequent to polymer formation. Namely, by reacting a water-soluble polymer having a plurality of primary amino groups with a silane coupling agent, a hydrolyzable silyl group may be introduced into that polymer. Alternatively, a water-soluble polymer having a hydrolyzable silyl group introduced therein may be obtained by reacting an amino compound having a primary amino group with a silane coupling agent, then effecting polymerization or polycondensation reaction.

Also in the first embodiment wherein a silane coupling agent having a haloalkyl group is used, hydrochloric acid forms as a by-product and so, some amino groups in the molecule become ammonium groups. This hydrogen chloride salt may or may not be neutralized with a metal alkoxide or the like into an inorganic salt.

While the silane coupling agent capable of reacting with a primary amino group to form a bond is used for introducing a hydrolyzable silyl group into the water-soluble silicon-containing polymer of the invention, exemplary silane coupling agents include silicon compounds having the general formulae (4) and (5).

(4)

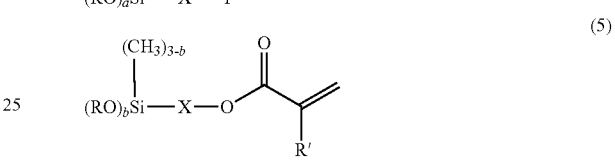

(5)

Note that Y is a halogen atom, X, R, R', a and b are as defined above.

Examples of suitable silicon compounds include, but are not limited to, chloromethyltrimethoxysilane, chloromethylmethyldimethoxysilane, chloromethyldimethylmethoxysilane, chloromethyltriethoxysilane, chloromethylmethyldiethoxysilane, chloromethyldimethylethoxysilane, 3-chloropropyltrimethoxysilane, 3-chloropropylmethyldimethoxysilane, 3-chloropropyldimethylmethoxysilane, 3-chloropropyltriethoxysilane, 3-chloropropylmethyldiethoxysilane, 3-chloropropyldimethylethoxysilane, 3-chloro-2-methylpropyltrimethoxysilane, 3-chloro-2-methylpropylmethyldimethoxysilane, 3-chloro-2-methylpropyldimethylmethoxysilane, 3-chloro-2-methylpropyltriethoxysilane, 3-chloro-2-methylpropylmethyldiethoxysilane, 3-chloro-2-methylpropyldimethylethoxysilane, (meth)acryloxymethyltrimethoxysilane, (meth)acryloxymethylmethyldimethoxysilane, (meth)acryloxymethyldimethylmethoxysilane, (meth)acryloxymethyltriethoxysilane, (meth)acryloxymethylmethyldiethoxysilane, (meth)acryloxymethyldimethylethoxysilane, 3-(meth)acryloxypropyltrimethoxysilane, 3-(meth)acryloxypropylmethyldimethoxysilane, 3-(meth)acryloxypropyldimethylmethoxysilane, 3-(meth)acryloxypropyltriethoxysilane, 3-(meth)acryloxypropylmethyldiethoxysilane, 3-(meth)acryloxypropyldimethylethoxysilane, 3-(meth)acryloxy-2-methylpropyltrimethoxysilane, 3-(meth)acryloxy-2-methylpropylmethyldimethoxysilane, 3-(meth)acryloxy-2-methylpropyldimethylmethoxysilane, 3-(meth)acryloxy-2-methylpropyltriethoxysilane, 3-(meth)acryloxy-2-methylpropylmethyldiethoxysilane, and 3-(meth)acryloxy-2-methylpropyldimethylethoxysilane. Inter alia, 3-chloropropyltrimethoxysilane and 3-acryloxypropyltrimethoxysilane are most preferred. These silicon compounds may be used alone or in admixture.

The water-soluble polymer having primary amino groups which is a precursor resin to the water-soluble silicon-containing polymer of the invention includes a polyallylamine obtained through homopolymerization of an allylamine which is a polymerizable monomer having a primary amino group. Other vinyl monomer units may be polymerized together insofar as this does not interfere with water solubility.

In preferred embodiments, a water-soluble polymer having primary amino groups represented by the general formula (3):

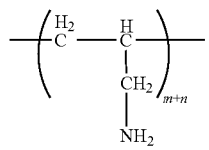

(3)

wherein m and n are as defined above is reacted with a halogen-containing organosilicon compound of formula (4) or a (meth)acryloxy-containing silicon compound of formula (5) in an alcohol and/or water.

Examples of the alcohol used herein include lower alcohols of 1 to 4 carbon atoms, such as methanol, ethanol, isopropanol, and butanol, with methanol and ethanol being preferred. The alcohol and/or water is preferably used in such amounts that the reaction mixture has a nonvolatile concentration of 20 to 50% by weight. Where alcohol and water are used in admixture, the preferred mixture contains 1 part by weight of water and 7 to 9 parts by weight of alcohol. The reaction temperature is generally up to 100° C., and preferably 25° C. to 70° C. The reaction time, which may be selected as appropriate, is generally 1 to 100 hours, and preferably 2 to 50 hours.

Referring back to formulae (1) and (2), the subscripts m and n stand for the number of allylamine units and the number of units resulting from reaction of allylamine with silane, respectively. A ratio of m to n represents a ratio of primary amino groups to silyl groups in the molecule. If 260<m or 100<n, which indicates a higher molecular weight, then such a polymer cannot be manufactured consistently because it reaches a very high viscosity at the synthesis stage. If m<10, and especially m=0, then acceptable water solubility is not available. If n<1, then a polymer lacks adhesion to inorganic materials. Whether the silane coupling agent to be reacted with the polyallylamine precursor resin is formula (4) or (5), the water-soluble silicon-containing polymer should preferably satisfy the equation: $0.003 \leq n/(m+n) \leq 0.9$, and more preferably $0.06 \leq n/(m+n) \leq 0.5$ wherein $n/(m+n)$ represents a ratio of the quantity (n) of silyl groups introduced to the quantity (m) of residual amino groups. If $n/(m+n)$ is smaller than the range, then a polymer may lack adhesion to inorganic materials. If $n/(m+n)$ is larger than the range, then a polymer may lack water solubility. It is then recommended that the polymer of formula (3) and the silicon compound of formula (4) or (5) be selected and used so that m and n may satisfy the above range.

It is noted that when the polymers of formulae (1) and (2) are neutralized with hydrochloric acid or an organic acid such as acetic acid, some amino groups become hydrogen chloride salts or organic acid salts. In the embodiment wherein the polymer of formula (3) is reacted with the silicon compound of formula (4), if the hydrogen halide formed is not removed, then the polymer of formula (1) is available as a polymer in which amino groups are hydrogen halide salts.

Preferably, the water-soluble silicon-containing polymer has a weight average molecular weight (Mw) of 300 to 3,000, and more preferably 1,000 to 2,000, as determined by gel permeation chromatography (GPC) versus polystyrene standards. If Mw is greater than 3,000, then a polymer may be prone to gel and thus be difficult to manufacture and hold in shelf. If Mw is less than 300, then polymer synthesis is difficult because of uncontrollable polymerization.

Most often, the water-soluble silicon-containing polymer is used as a coating agent or primer. On such use, the coating composition may contain a solvent such as methanol or ethanol, if necessary. Typically, the composition contains 5 to 90%, and preferably 10 to 80% by weight of the polymer and the balance of the solvent.

The substrates to be coated or treated with the water-soluble silicon-containing polymer include inorganic materials which are generally reactive with hydrolyzable silyl groups to form bonds and organic resins which are generally reactive with amino groups to form bonds. The shape of substrates is not particularly limited. Typical examples of inorganic materials include inorganic fillers such as silica, glass fibers and fiber glass items such as glass cloth, glass tape, glass mat and glass paper, ceramics, and metal substrates. Typical examples of organic resins include epoxy resins, phenolic resins, polyimide resins, and unsaturated polyester resins.

EXAMPLE

Examples of the invention are given below by way of illustration and not by way of limitation. All parts are by weight. In Examples, pH is a measurement at 25° C. The viscosity is measured at 25° C. by a Brookfield rotational viscometer. The abbreviation GC is gas chromatography, NMR is nuclear magnetic resonance spectroscopy, Mw is a weight average molecular weight as determined by gel permeation chromatography (GPC) versus polystyrene standards, and DOP is a degree of polymerization.

Example 1

Solvent exchange was carried out on 500.0 parts of a 15 wt % aqueous solution of polyallylamine (Nitto Boseki Co., Ltd, PAA-01, Mw=1000) by removing water under reduced pressure and adding methanol instead. It turned to a 15 wt % methanol solution. To the solution, to which 65.5 parts (0.33 mole) of 3-chloropropyltrimethoxysilane was added, was stirred at 60-70° C. for 40 hours. As hydrogen chloride formed with the progress of reaction, the reaction solution increased its chloride ion content. The chloride ion content of the solution was then measured by potentiometric titration using silver nitrate. The solution was found to have a chloride ion content of 2.0 wt %, which was equal to the quantity of chloride ions liberated on the completion of reaction. The completion of reaction was identified by this measurement. The solution was also analyzed by GC, but no peaks of the reactant, 3-chloropropyltrimethoxysilane were detected. On NMR analysis of silicon, there were observed no signals of 3-chloropropyltrimethoxysilane and instead, signals probably attributable to a target compound were observed. The completion of reaction was thus proven. 17.82 parts (0.33 mole) of sodium methylate was added to the solution, which was stirred at 60-70° C. for one hour, during which the amine hydrogen chloride salt in the solution was converted into sodium chloride. Thereafter, the precipitated sodium chloride was filtered off, and the filtrate was diluted with methanol to a concentration of 15 wt % of the active ingredient. The solution was a clear yellow solution which was quickly miscible with water and had pH 12.2 and a viscosity of 8.6 mPa-s and contained 0.5 wt % of chloride ions originating from the sodium chloride. The substrate polymer had a degree of polymerization of about 17 and the following average structural formula.

$$[CH_2CH(CH_2NH_2)]_{12.75}[CH_2CH(CH_2NHCH_2CH_2CH_2Si(OCH_3)_3)]_{4.25}$$

Example 2

Solvent exchange was carried out on 500.0 parts of a 15 wt % aqueous solution of polyallylamine (Nitto Boseki Co., Ltd, PAA-01, Mw=1000) by removing water under reduced pressure and adding methanol instead. It turned to a 15 wt % methanol solution. The solution, to which 32.8 parts (0.17 mole) of 3-chloropropyltrimethoxysilane was added, was stirred at 60-70° C. for 40 hours. As hydrogen chloride formed with the progress of reaction, the reaction solution increased its chloride ion content. The chloride ion content of the solution was then measured by potentiometric titration using silver nitrate. The solution was found to have a chloride ion content of 1.0 wt %, which was equal to the quantity of chloride ions liberated on the completion of reaction. The completion of reaction was identified by this measurement. The solution was also analyzed by GC, but no peaks of the reactant, 3-chloropropyltrimethoxysilane were detected. On NMR analysis of silicon, there were observed no signals of 3-chloropropyltrimethoxysilane and instead, signals probably attributable to a target compound were observed. The completion of reaction was thus proven. 8.9 parts (0.17 mole) of sodium methylate was added to the solution, which was stirred at 60-70° C. for one hour, during which the amine hydrogen chloride salt in the solution was converted into sodium chloride. Thereafter, the precipitated sodium chloride was filtered off, and the filtrate was diluted with methanol to a concentration of 15 wt % of the active ingredient. The solution was a clear yellow solution which was quickly miscible with water and had pH 12.3 and a viscosity of 2.1 mPa-s and contained 0.4 wt % of chloride ions originating from the sodium chloride. The substrate polymer had a degree of polymerization of about 17 and the following average structural formula.

$$[CH_2CH(CH_2NH_2)]_{14.87}[CH_2CH(CH_2NHCH_2CH_2CH_2Si(OCH_3)_3)]_{2.13}$$

Example 3

Solvent exchange was carried out on 500.0 parts of a 20 wt % aqueous solution of polyallylamine (Mw=700) by removing water under reduced pressure and adding methanol instead. It turned to a 15 wt % methanol solution. The solution, to which 83.4 parts (0.42 mole) of 3-chloropropyltrimethoxysilane was added, was stirred at 60-70° C. for 40 hours. As hydrogen chloride formed with the progress of reaction, the reaction solution increased its chloride ion content. The chloride ion content of the solution was then measured by potentiometric titration using silver nitrate. The solution was found to have a chloride ion content of 2.0 wt %, which was equal to the quantity of chloride ions liberated on the completion of reaction. The completion of reaction was identified by this measurement. The solution was also analyzed by GC, but no peaks of the reactant, 3-chloropropyltrimethoxysilane were detected. On NMR analysis of silicon, there were observed no signals of 3-chloropropyltrimethoxysilane and instead, signals probably attributable to a target compound were observed. The completion of reaction was thus proven. 22.7 parts (0.42 mole) of sodium methylate was added to the solution, which was stirred at 60-70° C. for one hour, during which the amine hydrogen chloride salt in the solution was converted into sodium chloride. Thereafter, the precipitated sodium chloride was filtered off, and the filtrate was diluted with methanol to a concentration of 15 wt % of the active ingredient. The solution was a clear yellow solution which was quickly miscible with water and had pH 11.8 and a viscosity of 5.3 mPa-s and contained 0.5 wt % of chloride ions originating from the sodium chloride. The substrate polymer had a degree of polymerization of about 12 and the following average structural formula.

$$[CH_2CH(CH_2NH_2)]_{18.93}[CH_2CH(CH_2NHCH_2CH_2CH_2Si(OCH_3)_3)]_{3.07}$$

Example 4

Solvent exchange was carried out on 500.0 parts of a 20 wt % aqueous solution of polyallylamine (Mw=2500) by removing water under reduced pressure and adding methanol instead. It turned to a 15 wt % methanol solution. The solution, to which 85.4 parts (0.43 mole) of 3-chloropropyltrimethoxysilane was added, was stirred at 60-70° C. for 40 hours. As hydrogen chloride formed with the progress of reaction, the reaction solution increased its chloride ion content. The chloride ion content of the solution was then measured by potentiometric titration using silver nitrate. The solution was found to have a chloride ion content of 2.0 wt %, which was equal to the quantity of chloride ions liberated on the completion of reaction. The completion of reaction was identified by this measurement. The solution was also analyzed by GC, but no peaks of the reactant, 3-chloropropyltrimethoxysilane were detected. On NMR analysis of silicon, there were observed no signals of 3-chloropropyltrimethoxysilane and instead, signals probably attributable to a target compound were observed. The completion of reaction was thus proven. 22.7 parts (0.42 mole) of sodium methylate was added to the solution, which was stirred at 60-70° C. for one hour, during which the amine hydrogen chloride salt in the solution was converted into sodium chloride. Thereafter, the precipitated sodium chloride was filtered off, and the filtrate was diluted with methanol to a concentration of 15 wt % of the active ingredient. The solution was a clear yellow solution which was quickly miscible with water and had pH 11.5 and a viscosity of 15.1 mPa-s and contained 0.5 wt % of chloride ions originating from the sodium chloride. The substrate polymer had a degree of polymerization of about 44 and the following average structural formula.

$$[CH_2CH(CH_2NH_2)]_{33.04}[CH_2CH(CH_2NHCH_2CH_2CH_2Si(OCH_3)_3)]_{10.96}$$

Example 5

Solvent exchange was carried out on 500.0 parts of a 15 wt % aqueous solution of polyallylamine (Nitto Boseki Co., Ltd, PAA-01, Mw=1000) by removing water under reduced pressure and adding methanol instead. It turned to a 15 wt % methanol solution. The solution, to which 65.5 parts (0.33 mole) of 3-chloropropyltrimethoxysilane was added, was stirred at 60-70° C. for 40 hours. As hydrogen chloride formed with the progress of reaction, the reaction solution increased its chloride ion content. The chloride ion content of the solution was then measured by potentiometric titration using silver nitrate. The solution was found to have a chloride ion content of 2.0 wt %, which was equal to the quantity of chloride ions liberated on the completion of reaction. The completion of reaction was identified by this measurement. The solution was also analyzed by GC, but no peaks of the reactant, 3-chloropropyltrimethoxysilane were detected. On NMR analysis of silicon, there were observed no signals of 3-chloropropyltrimethoxysilane and instead, signals probably attributable to a target compound were observed. The completion of reaction was thus proven. The solution was diluted with methanol to a concentration of 15 wt % of the active ingredient. The solution was a clear yellowish brown solution which was quickly miscible with water and had pH 11.1 and a viscosity of 9.6 mPa-s and contained 2.0 wt % of chloride ions originating from the amine hydrogen chloride salt. The substrate polymer had a degree of polymerization of about 17 and the following average structural formula.

[$CH_2CH(CH_2NH_2)$]$_{12.75}$[$CH_2CH(CH_2NHCH_2CH_2CH_2Si(OCH_3)_3)$]$_{4.25}$

Example 6

Solvent exchange was carried out on 500.0 parts of a 15 wt % aqueous solution of polyallylamine (Nitto Boseki Co., Ltd, PAA-01, Mw=1000) by removing water under reduced pressure and adding methanol instead. It turned to a 15 wt % methanol solution. The solution, to which 77.2 parts (0.33 mole) of 3-acryloxypropyltrimethoxysilane was added, was stirred at 60-70° C. for 5 hours. The reactant, 3-acryloxypropyltrimethoxysilane was consumed with the progress of reaction. The solution was analyzed by GC, but no peaks of the reactant, 3-acryloxypropyltrimethoxysilane were detected. On NMR analysis of silicon, there were observed no signals of 3-acryloxypropyltrimethoxysilane and instead, signals probably attributable to a target compound were observed. The completion of reaction was thus proven. The solution was diluted with methanol to a concentration of 15 wt % of the active ingredient. The solution was a clear yellow solution which was quickly miscible with water and had pH 11.7 and a viscosity of 2.7 mPa-s. The substrate polymer had a degree of polymerization of about 17 and the following average structural formula.

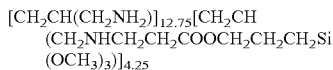

[$CH_2CH(CH_2NH_2)$]$_{12.75}$[$CH_2CH(CH_2NHCH_2CH_2COOCH_2CH_2CH_2Si(OCH_3)_3)$]$_{4.25}$

Comparative Example 1

Water was removed from 500.0 parts of a 15 wt % aqueous solution of polyallylamine (Nitto Boseki Co., Ltd, PAA-25, Mw=25,000, DOP=~439) by vacuum distillation. The solution increased its viscosity as the amount of water decreased. Finally, the solution became quite difficult to handle, and water removal was no longer possible. Methanol was added to dissolve the solids, obtaining a mixed solution of 15 wt % methanol and water. 65.5 parts (0.33 mole) of 3-chloropropyltrimethoxysilane was added to this solution whereupon the silane gelled. Synthesis could no longer continue.

Comparative Example 2

Water was removed from 500.0 parts of a 15 wt % aqueous solution of polyallylamine (Nitto Boseki Co., Ltd, PAA-25, Mw=25,000, DOP=~439) by vacuum distillation. The solution increased its viscosity as the amount of water decreased. Finally, the solution became quite difficult to handle, and water removal was no longer possible. Methanol was added to dissolve the solids, obtaining a mixed solution of 15 wt % methanol and water. 77.2 parts (0.33 mole) of 3-acryloxypropyltrimethoxysilane was added to this solution whereupon the silane gelled. Synthesis could no longer continue.

Comparative Example 3

Solvent exchange was carried out on 500.0 parts of a 15 wt % aqueous solution of polyallylamine (Nitto Boseki Co., Ltd, PAA-01, Mw=1000) by removing water under reduced pressure and adding methanol instead. It turned to a 15 wt % methanol solution. The solution, to which 260.7 parts (1.31 moles) of 3-chloropropyltrimethoxysilane was added, was stirred at 60-70° C. for 40 hours. As hydrogen chloride formed with the progress of reaction, the reaction solution increased its chloride ion content. The chloride ion content of the solution was then measured by potentiometric titration using silver nitrate. The solution was found to have a chloride ion content of 6.1 wt %, which was equal to the quantity of chloride ions liberated on the completion of reaction. The completion of reaction was identified by this measurement. The solution was also analyzed by GC, but no peaks of the reactant, 3-chloropropyltrimethoxysilane were detected. On NMR analysis of silicon, there were observed no signals of 3-chloropropyltrimethoxysilane and instead, signals probably attributable to a target compound were observed. The completion of reaction was thus proven. 70.7 parts (1.31 moles) of sodium methylate was added to the solution, which was stirred at 60-70° C. for one hour, during which the amine hydrogen chloride salt in the solution was converted into sodium chloride. Thereafter, the precipitated sodium chloride was filtered off, and the filtrate was diluted with methanol to a concentration of 15 wt % of the active ingredient. The solution was a clear yellow solution which had pH 12.1 and a viscosity of 10.3 mPa-s and contained 0.5 wt % of chloride ions originating from the sodium chloride. The substrate polymer had a degree of polymerization of about 17 and the following average structural formula.

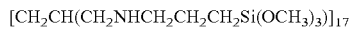

[$CH_2CH(CH_2NHCH_2CH_2CH_2Si(OCH_3)_3)$]$_{17}$

This solution, however, was less water soluble because it turned white turbid when mixed with water.

Comparative Example 4

Solvent exchange was carried out on 500.0 parts of a 15 wt % aqueous solution of polyallylamine (Nitto Boseki Co., Ltd, PAA-01, Mw=1000) by removing water under reduced pressure and adding methanol instead. It turned to a 15 wt % methanol solution. The solution, to which 306.5 parts (1.31 moles) of 3-acryloxypropyltrimethoxysilane was added, was stirred at 60-70° C. for 5 hours. The reactant, 3-acryloxypropyltrimethoxysilane was consumed with the progress of reaction. The solution was analyzed by GC, but no peaks of the reactant, 3-acryloxypropyltrimethoxysilane were detected. On NMR analysis of silicon, there were observed no signals of 3-acryloxypropyltrimethoxysilane and instead, signals probably attributable to a target compound were observed. The completion of reaction was thus proven. The solution was diluted with methanol to a concentration of 15 wt % of the active ingredient. The solution had pH 11.9 and a viscosity of 6.5 mPa-s. The substrate polymer had a degree of polymerization of about 17 and the following average structural formula.

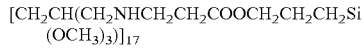

[$CH_2CH(CH_2NHCH_2CH_2COOCH_2CH_2CH_2Si(OCH_3)_3)$]$_{17}$

This solution, however, was less water soluble because it turned white turbid when mixed with water.

Comparative Example 5

A primer composition was obtained by dissolving 3-aminopropyltrimethoxysilane in methanol in a concentration of 15 wt %.

Comparative Example 6

Solvent exchange was carried out on 500.0 parts of a 15 wt % aqueous solution of polyallylamine (Nitto Boseki Co., Ltd, PAA-01, Mw=1000) by removing water under reduced pressure and adding methanol instead. It turned to a 15 wt % methanol solution, which was used as a primer composition.

Example 7

Preparation of Polyurethane Elastomer for Adhesion Test 150 parts of polyoxytetramethylene glycol with a number average molecular weight of 1,000, 100 parts of 1,6-xylene glycol, 0.5 part of water, 200 parts of hexamethylene diisocyanate, and 800 parts of dimethylformamide were mixed by agitation, and heated at 90° C. The mixture was agitated at the temperature for a further 2 hours, allowing the reaction to run. The reaction was stopped by adding 3 parts of dibutyl amine. The excess of amine was neutralized with acetic anhydride, yielding a polyurethane elastomer.

[Adhesion Test of Primer]

Each of the primer compositions obtained in Examples and Comparative Examples was brush coated to glass, steel and aluminum plates, and dried at 120° C. for 5 minutes. The polyurethane elastomer was brush coated thereon and dried at 100° C. for 10 minutes. The coating was subjected to a cross-hatch adhesion test by scribing the coating in orthogonal directions at intervals of 1 mm to define 100 sections, attaching a pressure-sensitive adhesive tape to the coating, and stripping the tape. The number of stripped coating sections was counted, based on which the adhesion of primer to the urethane resin and the inorganic substrate was evaluated. For all the primers of Examples, the number of stripped sections was zero, when applied to the three substrates. Superior adhesion performance was demonstrated.

[Water Solubility Test of Primer]

Each of the primer compositions obtained in Examples and Comparative Examples was held for about 10 hours in a 10 wt % aqueous solution form. Then the solution was visually observed for turbidity due to insoluble matter, precipitation, and layer separation.

The results of the adhesion test and water solubility test on the compositions of Examples and Comparative Examples are shown in Tables 1, 2 and 3.

TABLE 1

| Substrate | | Adhesion | Water solubility |
|---|---|---|---|
| Glass plate | Example 1 | 100/100 | ○ |
| | Example 2 | 100/100 | ○ |
| | Example 3 | 100/100 | ○ |
| | Example 4 | 100/100 | ○ |
| | Example 5 | 100/100 | ○ |
| | Example 6 | 100/100 | ○ |
| | Comparative Example 3 | 68/100 | Δ |
| | Comparative Example 4 | 72/100 | Δ |
| | Comparative Example 5 | 94/100 | Δ |
| | Comparative Example 6 | 73/100 | ○ |

TABLE 2

| Substrate | | Adhesion |
|---|---|---|
| Steel plate | Example 1 | 100/100 |
| | Example 2 | 100/100 |
| | Example 3 | 100/100 |
| | Example 4 | 100/100 |
| | Example 5 | 100/100 |
| | Example 6 | 100/100 |

TABLE 2-continued

| Substrate | Adhesion |
|---|---|
| Comparative Example 3 | 61/100 |
| Comparative Example 4 | 60/100 |
| Comparative Example 5 | 95/100 |
| Comparative Example 6 | 63/100 |

TABLE 3

| Substrate | | Adhesion |
|---|---|---|
| Aluminum plate | Example 1 | 100/100 |
| | Example 2 | 100/100 |
| | Example 3 | 100/100 |
| | Example 4 | 100/100 |
| | Example 5 | 100/100 |
| | Example 6 | 100/100 |
| | Comparative Example 3 | 75/100 |
| | Comparative Example 4 | 73/100 |
| | Comparative Example 5 | 90/100 |
| | Comparative Example 6 | 68/100 |

It is proven from the data of Examples and Comparative Examples that better results of adhesion are accomplished by the primer composition of the invention.

Japanese Patent Application No. 2006-318523 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a water-soluble silicon-containing polymer comprising recurring units having the general formula (2):

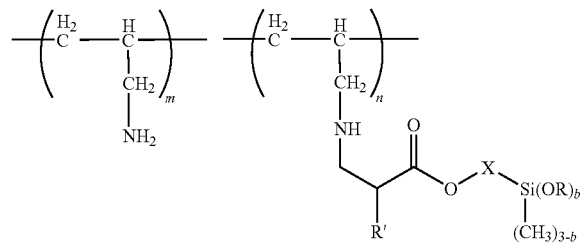

(2)

wherein m is a number from 10 to 260, n is a number from 1 to 100, x is a $C_1$-$C_{10}$ alkylene chain which may be substituted with a $C_1$-$C_6$ alkyl group, R is hydrogen, a $C_1$-$C_4$ alkyl group or acetyl group, R' is hydrogen or methyl, and "b" is an integer of 1 to 3, said polymer having a plurality of primary amino groups and a hyrolyzable silyl or silanol group, and having an average molecular weight of 300 to 3,000, said method comprising the steps of:

reacting a water-soluble primary amino group containing polymer having the general formula (3):

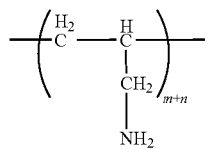 (3)
wherein m and n are as defined above, with a silicon compound having the general formula (5):
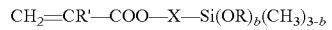 (5)
wherein X, R, R', and "b" are as defined above, in an alcohol and/or water.
2. The method of claim 1, wherein m and n are numbers in the range: $0.003 \leqq n/(m+n) \leqq 0.9$.
* * * * *